US012809325B2

(12) United States Patent
Stutz et al.

(10) Patent No.: US 12,809,325 B2
(45) Date of Patent: Nov. 24, 2026

(54) METHOD AND APPARATUS FOR COUPLING THE FUNCTIONAL CONTROL IN A DISTRIBUTED AUTOMATION SYSTEM

(71) Applicant: Siemens Aktiengesellschaft, Munich (DE)

(72) Inventors: Andreas Stutz, Eggenstein-Leopoldshafen (DE); Mathias Maurmaier, Gerlingen (DE); Michelle Blumenstein, Zeulenroda-Triebes/Triebes (DE)

(73) Assignee: Siemens Aktiengesellschaft, Munich (DE)

( * ) Notice: Subject to any disclaimer, the term of this patent is extended or adjusted under 35 U.S.C. 154(b) by 282 days.

(21) Appl. No.: 18/571,470

(22) PCT Filed: Jun. 18, 2021

(86) PCT No.: PCT/EP2021/066593
§ 371 (c)(1),
(2) Date: Dec. 18, 2023

(87) PCT Pub. No.: WO2022/262993
PCT Pub. Date: Dec. 22, 2022

(65) Prior Publication Data
US 2024/0288840 A1 Aug. 29, 2024

(51) Int. Cl.
*G05B 15/02* (2006.01)

(52) U.S. Cl.
CPC .................................... *G05B 15/02* (2013.01)

(58) Field of Classification Search
CPC .... G05B 15/02; G05B 19/4185; G05B 23/02; H04L 12/4641; H04L 67/12
See application file for complete search history.

(56) References Cited

U.S. PATENT DOCUMENTS 8,776,050 B2 * 7/2014 Plouffe ............... G06F 9/45537 718/1
10,705,511 B2 * 7/2020 Ludwig .............. G05B 19/4186
(Continued)

FOREIGN PATENT DOCUMENTS

DE 102008058033 A1 5/2010
JP 2018530839 A 10/2018
(Continued)

OTHER PUBLICATIONS

Badar et al., "Intelligent Edge Control with Deterministic-IP based Industrial Communication in Process Automation," 2019 15th International Conference on Network and Service Management (CNSM), Halifax, NS, Canada, 2019, pp. 1-7, doi: 10.23919/CNSM46954.2019.9012680. (Year: 2019).*
(Continued)

*Primary Examiner* — Jerry B Dennison
(74) *Attorney, Agent, or Firm* — Lempia Summerfield Katz LLC

(57) ABSTRACT

In today's automation systems, there is a close coupling between the functional implementation and the connection thereof to the physical process. This coupling is above all characterised in that the integration possibilities of decentralised periphery are limited to the integration of individual hardware-specific signals. The invention relates to a component-based and function-encapsulating system architecture which overcomes present challenges by associating increasingly more intelligent devices in the field as functional components.

12 Claims, 5 Drawing Sheets

(56) References Cited

U.S. PATENT DOCUMENTS

| | | | | |
|---|---|---|---|---|
| 2010/0135311 | A1 | 6/2010 | Schneider et al. | |
| 2013/0297772 | A1* | 11/2013 | Ashok | H04L 41/0803 709/224 |
| 2014/0025186 | A1 | 1/2014 | Ojha et al. | |
| 2014/0351443 | A1 | 11/2014 | Tang et al. | |
| 2016/0003892 | A1 | 1/2016 | Blancha et al. | |
| 2017/0180462 | A1* | 6/2017 | Leonelli | G06F 8/30 |
| 2018/0024537 | A1* | 1/2018 | Chauvet | G05B 19/4185 718/104 |
| 2018/0231959 | A1 | 8/2018 | Jundt et al. | |
| 2018/0314222 | A1 | 11/2018 | Hoernicke et al. | |
| 2019/0101899 | A1 | 4/2019 | Enver | |
| 2020/0019147 | A1 | 1/2020 | Ludwig et al. | |
| 2020/0174463 | A1 | 6/2020 | Cella et al. | |
| 2021/0141357 | A1 | 5/2021 | Schroeder | |
| 2024/0272600 | A1* | 8/2024 | Stutz | G05B 19/0428 |
| 2024/0288840 | A1* | 8/2024 | Stutz | H04L 12/4641 |

FOREIGN PATENT DOCUMENTS

| | | | |
|---|---|---|---|
| JP | 2019079508 | A | 5/2019 |
| JP | 2020009451 | A | 1/2020 |

OTHER PUBLICATIONS

PCT International Search Report and Written Opinion of International Searching Authority mailed Mar. 9, 2022, corresponding to PCT International Application No. PCT/EP2021/066593.

PCT Preliminary Report on Patentability of International Searching Authority mailed May 23, 2023, corresponding to PCT International Application No. PCT/EP2021/066593.

* cited by examiner

METHOD AND APPARATUS FOR COUPLING THE FUNCTIONAL CONTROL IN A DISTRIBUTED AUTOMATION SYSTEM

This application is the National Stage of International Application No. PCT/EP2021/066593, filed Jun. 18, 2021. The entire contents of this document are hereby incorporated herein by reference.

BACKGROUND

Trends toward ever greater individualization of products, shorter product life cycles, and high volatility of the markets may be noted, initially in production automation, and also by now in the process industry. These market developments require an ever greater changeability of production plants. This changeability is subject to five enabling features: universality, mobility, scalability, modularity and compatibility. Universality describes the dimensioning and design of a plant for various requirements in terms of the product and the technology (e.g., variant variety). Mobility provides for the locally unrestricted movability of objects (e.g., machines on rollers). In the case of scalability, technical, spatial, and personal breathability (e.g., expandability and reducibility) is desired (e.g., economical adaptation of the size of the plant according to the prevailing market requirements). In the course of modularity, standardized, functional units or elements are intended to be provided (e.g., "plug & produce" modules). Compatibility provides networkability in terms of material, information, media, and energy (e.g., standardized software interfaces).

These features are to be taken into account not only in the hardware design of a production plant, but also, for example, in the configuration of the automation technology. This poses challenges for modern automation systems.

In modern automation systems, there is close coupling between the functional implementation and its connection to the physical process. This coupling is characterized, for example, by the fact that the options for integrating decentralized peripherals are restricted to the incorporation of individual hardware-specific signals. Different sensors and actuators are controlled using different interfaces, even if they perform similar or identical tasks. This aspect obstructs a number of change enablers.

With regard to universality, there is the problem that a variety of variants may scarcely be achieved in the implementation of the sensor and actuator logic since this is reflected in different signal interfaces.

The use of more intelligent field devices or more powerful technologies is also restricted for the same reason, which obstructs the scalability change enabler.

There is compatibility in terms of the information flows between decentralized peripherals and the automation system only when the corresponding signal interfaces correspond. Compatibility is not provided when there is a variance of different sensor and/or actuator types and associated variance of the signal interfaces.

The connection of decentralized peripherals to the automation system based on individual signals is associated with a large number of individual lines and the use of additional remote IO assemblies. This restricts the simple reconnection of sensors and actuators to another point of the plant and therefore their mobility.

The modularity of the plant is significantly decisive for implementing the change enablers mentioned above. This is nowadays often restricted to the physical structure of the plant and is not reflected in the automation software.

In summary, it may be concluded that decentralized peripherals have previously been connected to the automation system based on individual signals that directly control sensors and actuators. This was previously sufficient since automation software was based on converting input signals into output signals using simple signal-converting logic. However, as soon as the requirement for changeability is imposed on a system, this concept entails the above-mentioned challenges.

PRIOR ART

The use of intelligent field devices (e.g., decentralized intelligence) is an approach for managing the challenges shown that already exists nowadays. The logic for controlling individual small sensors and actuators is not implemented in the automation system, but rather directly in the field (e.g., where it is required). Such approaches are known from the edge environment, for example. This provides the advantage that the automation system no longer has to process any individual signals for controlling the decentralized peripherals. Instead, the functionality of a sensor, an actuator, or an entire control loop is abstracted and is made available to the automation system via a defined, at best standardized interface.

PROFIBUS PA is a technology that already nowadays uses this idea in approaches. In this case, functional modules that implement communication in the field without being integrated in the automation system were standardized. However, signal-based abstraction is still present in PROFIBUS PA. In the field of the production industry, the basis for decentralized intelligence was provided by the IO link technology. Use of these approaches is nowadays restricted by the fact that modern integration technologies consider the integrated functions of intelligent devices only partially or not at all.

In addition to these field bus systems, some manufacturers also offer miniature controllers that are very highly suited to implementing decentralized intelligence in the field (e.g., the TBEN-L-PLC from Turck). In addition to a CODESYS-based control component, this also has the option of communicating with other programmable logic controllers (PLC) or directly with a cloud using different protocols (e.g., PROFINET, Ethernet, Modbus).

Within the scope of the VDI/VDE/NAMUR 2658 standard, complete functions of process plants are partly outsourced, as decentralized intelligence, to modules (e.g., process equipment assemblies (PEAs)). A similar approach is also taken by the research field around skills and capabilities in the field of production automation. The concepts of modular automation based on VDI/VDE/NAMUR 2658 are considered to be a very good approach to implementing decentralized intelligence in future automation systems and therefore to solving the problem shown.

The architecture concept of VDI/VDE/NAMUR 2658 is also illustrated in more detail in FIG. 5.

The layer model is constructed from the bottom up as follows. A more detailed description of the individual modules follows further below:

Hardware configuration, HWC

Process image of the inputs, PAE $|_{[MM(PTD1)}$/process image of the outputs PA Signal abstraction layer SAL Service module SM1

Control module CM1, CM2, CM3

Control module types CMT1, . . .

In the example illustrated, communication takes place according to the OPC UA standard.

The modern concepts of modular automation are based on providing process functions as decentralized intelligence. These functions are implemented in the form of services in modular process units PEAs.

Service module SM and control module CM: A service is composed of a service module SM and any desired number of control modules CM. The control logic of the service is implemented in the service module based on a standardized state machine. However, it has not yet been specified which sensors and actuators are used to perform the service. In contrast, the control modules encapsulate the logic for controlling sensors and/or actuators and are therefore used to connect the service to the physical process.

In order to implement a complete service, the required control modules are to be assigned to a service module. This assignment is flexibly implemented in the architecture concept presented here. For this purpose, the program of the service modules is developed against a type interface for sensors and actuators. It includes corresponding placeholder modules at locations at which it is necessary to interact with the production process and therefore to integrate a control module. These placeholders are implemented as control module types CMT and have the same standardized Interface as the control modules that are intended to subsequently fill the placeholders. In this case, various control module types CMT with various interfaces are available for valves, motors, sensors, or entire control loops, for example. In order to implement the service, the interfaces of the desired control modules CM are mapped to the interfaces of the placeholders CMTs. In this manner, the sensors and actuators to be actually controlled are assigned to the SM.

However, this procedure has the disadvantage that the assignment is carried out once during the engineering of the system and may then no longer be adapted without adapting the control program.

A configuration and runtime interface for service modules SM is provided by an OPC UA server that is likewise included in the modular process unit PEA. The interface may be used to set configuration and procedure parameters of service modules SMs and to adjust the state machine of the service module SM (e.g., start, stop, etc.).

Signal Abstraction Layer, SAL

Interaction between the control modules CMs and the sensors and actuators of the production process is based on conventional mechanisms. In the course of hardware configuration HWC, hardware addresses at which the sensors and actuators used may be found are defined. The current values behind these addresses are recorded, at the beginning of each PLC control cycle, in a process image of the inputs PAE in the case of the sensor signals and in a process image of the outputs PAA in the case of the actuator signals. The values stored in the PAE and PAA may then be used in the control program of the control modules CM. In order to simplify the use of these signals, however, the hardware addresses themselves are not used in the program, but rather, user-defined symbols that are assigned to the hardware addresses. The relationship between the hardware addresses defined in the HWC and the symbols used in the program is effected using a mechanism that is referred to as the signal abstraction layer SAL.

The modular process units PEA in the sense of VDI/VDE/NAMUR 2658 therefore provide decentralized intelligence abstracted via standardized interfaces. The problem shown is therefore solved at the level of the PEAs. A modular plant in the sense of VDI/VDE/NAMUR 2658 may be changed such that entire PEAs may be integrated, de-integrated, and replaced.

It was shown in the previous section that interaction with the production process within a modular process unit PEA is still based on individual control signals toward sensors and actuators.

The PEA therefore cannot be changed with respect to the integration, de-integration, and replacement of individual sensors and actuators. This is due to the fact that the signals needed for interaction between the control module CM and the field level may vary depending on the type and variant of sensors and actuators used. For example, there are valves with no feedback signal, one feedback signal, or a double feedback signal. Motors may be configured with or without a speed specification, speed feedback, or rotation direction switching. The signal abstraction layer cannot capture this variant variety since it abstracts at the level of the individual signals. This greatly restricts the degrees of freedom of sensor and actuator replacement and therefore the changeability of a PEA.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and a system that overcome the disadvantages provided in the prior art are provided.

A component-based and function-encapsulating system architecture is presented. The system architecture manages current challenges by increasingly associating more intelligent devices in the field as functional components.

Fundamental Architectural Approach:

In contrast to a signal abstraction layer SAL, a transition between control modules CM and service modules SM (also referred to below as the component abstraction and management layer CAML) is able to abstract the described variant variety of the sensors and actuators. Based on this, within the scope of the present embodiments, a system is presented that provides the CAML as the abstraction level for sensor and actuator functionality. A possible automation architecture is illustrated in FIG. 3 and is explained in more detail below.

The fundamental structure of this architecture is heavily based on the architecture of VDI/VDE/NAMUR 2658 mentioned in the introductory part of the description. However, in order to differentiate both approaches, the terms service module SM, control module CM, and control module template CMT were no longer selected, but rather, the text below refers instead to service components SC, control component CC, and control component type CCT. The term "component" is based on the lowermost level in the structural model of modular plants according to VDI 2776 (Process engineering plants-Modular plants, Fundamentals and planning modular plants). A control component type CCT makes it possible to implement the control component, for example, with an open standardized interface in which real data may be assigned to a specific application only at a later time (e.g., via the interface).

Control Component

Automation devices (e.g., sensors, actuators, package units, IO stations) are becoming increasingly more intelligent and have their own computing capacities, with the result that their firmware may provide more than just signals.

A CC is the software representation of an automation device. This representation may be executed on the device itself or on a controller, etc. The automation device and representation are addressable.

This component is an addressable unit and has a standardized interface (e.g., according to 2658); this is the main difference from the control modules CM known from the prior art.

Device-specific special features are locally resolved in the component, with the result that the component always has an identical external appearance. The device may itself be a separate computer resource (e.g., embedded device) or may be expanded with an external computer resource via established field bus systems.

In summary, a control component has the following technical features: Connection to the industrial process (e.g., production or process engineering process); Separate computer capacities for processing software (e.g., embedded device, PLC, edge device); Standardized communication technology (e.g., OPC UA server/client, OPC UA Pub/Sub); Standardized function-oriented component interface (e.g., according to VDI/VDE/NEMUR 2658); Device-specific adaptation for complying with the standardized component interface may be locally resolved in the separate computer capacity (e.g., a valve has no feedback, one item of feedback, or two items of feedback); Control component as a functional unit is addressable as an entity (e.g., opc.tcp://192.168.2.1:4840/ns=1:s=TI001)

The control component address is dependent on the underlying communication technology.

Service Component

Services encapsulate automation functions in various forms, in terms of both process and production engineering.

From individual sensor/actuator functions to the control function of an entire plant, basically everything may be encapsulated as a service.

A service is a software-implemented function and describes logic for how incoming process variables are processed to form outgoing process variables. Therefore, services initially do not have any direct contact with the process. Such a service that does not have any direct connections to the process to be automated is referred to as a service component below.

A service component is executed on a dedicated computer capacity and is likewise uniquely addressable.

In addition, a service component has a plurality of open interfaces for integrating control components, the devices of which are given defined roles in the execution of the automated function.

In summary, a service component has the following technical features: No direct connection to the process, only an indirect connection via connected control components; software of the service component runs on a computer resource (e.g., embedded device, PLC, edge device); standardized communication technology (e.g., OPC UA server/client, OPC UA Pub/Sub); standardized function-oriented component interface (e.g., according to VDI/VDE/NAMUR 2658); and the service component as a functional unit is addressable as an entity (e.g., opc.tcp://192.168.2.1:4840/ns=1:s=Mixing).

The service component address is dependent on the underlying communication technology.

A control component represents an automation device and provides a basic function (e.g., provider).

A service component represents a higher-quality automation function and uses control components for this purpose (e.g., consumer). A service component may represent an even higher automation function that itself uses service components (e.g., and is thus a service component provider and consumer).

The control and service components are addressed and integrated via the newly introduced integration layer CAML, which implements the described provider/consumer mechanism. Three variants that are implemented are described below.

The provider/consumer mechanism has the following features: Based on a standardized communication technology; based on a standardized interface definition; a provider and consumer is uniquely addressable as an entity (e.g., addressing of the entity and not of the individual signals); provider and consumer interaction may be implemented both unidirectionally and bidirectionally; depending on the implementation of interaction, only one side is to configure an address or addresses are to be configured on both sides; a control component has a provider part; a service component has a consumer part for connecting control and other service components; and a service component also has a provider part.

The principle of flexibly assigning sensor/actuator logic (e.g., encapsulated in control modules) to the functional logic (e.g., encapsulated in service modules), as described further above, is likewise used in this architecture. Functionality for accessing decentralized peripherals is thus encapsulated in control components CC. The programs of the service components SC contain placeholder CCTs with corresponding interfaces that may be assigned control components CC during the engineering of the system. In this manner, a decision is made as to which sensors and actuators are actually intended to be used in the system.

Component Abstraction and Management Layer

As an extension of this approach, the introduction of the component abstraction and management layer CAML is provided. This may be implemented as a system functionality in a PLC, for example.

The new layer CAML makes it possible to encapsulate the decentralized intelligence and to provide the decentralized intelligence, as components with a standardized interface, to a control program (e.g., a service component SC). In order to achieve this, the CAML may undertake the following tasks.

Abstraction Functionality:

The component abstraction and management layer CAML constitutes an abstraction layer. This is able to abstract the functionality of sensors, actuators, and entire control loops and to make it available to the functional logic (e.g., in this case, a service component SC) as components with a standardized interface. This abstraction functionality of the CAML includes the mapping of a possibly proprietary interface of the control module to a standardized interface and therefore creates a CC with respect to the abstraction from a CM.

A standardized interface may have the following appearance, for example.

In this case, it should be noted that CCs may encapsulate a number of different functionalities.

These include various sensors (e.g., for temperature or pressure measurement), actuators (e.g., for controlling valves or drives), or entire control loops.

Different interfaces are to be provided for these different types of CCs, to which interfaces the CC functionality may be abstracted in a suitable manner. For this purpose, the interfaces described in the MTP standard, part 3 [7] are provide in one configuration.

Table 5.1 provides an overview—from "Interfaces for data objects" specified in

| VDI/VDE/NAMUR 2658-3: | |
|---|---|
| Interface family | Basic interface (extension) |
| Analog value displays | AnaView, (AnaMon) |
| Analog value operators | AnaMan, (AnaManInt) |
| Binary value displays | BinView, (BinMon) |
| Binary value operators | BinMan, (BinManInt) |
| Digital value displays | DIntView, (DIntMon) |
| Digital value operators | DIntMan, (DIntManInt) |
| String display | StringView |
| Controls | PIDCtrl |
| Binary valves | BinVlv, (MonBinVlv) |
| Controllable valves | AnaVlv, (MonAnaVlv) |
| Binary drive | BinDrv, (MonBinDrv) |

If a control component CC to be incorporated is not in the same controller as the service component SC, communication to this remote control component CC is also abstracted by the CAML. In this manner, control components CC may always be controlled in the same manner by the service component SC irrespective of what the implementation of the CC looks like or on which controller it is executed.

Assignment Functionality:

In the architecture known as prior art, the assignment between the control module CM and the control module type CMT is determined once during the engineering process and may then be adapted only by changing the control program. In the architecture provided in the present embodiments, the CAML enables a configurable assignment between the control module CC and the control module type CCT. It is therefore possible to flexibly reconfigure the sensors and actuators incorporated in the system at the runtime of the plant without having to adapt control code. A corresponding configuration and runtime interface is required for this purpose. The prerequisite for this is the addressability of the control components CC.

Communication Functionality:

If a control component CC is not implemented in the same controller as the service component SC in which it is intended to be integrated, communication between the two controllers is to be provided. This communication functionality may be undertaken by the CAML.

A mechanism for the unified integration of decentralized logic in an automation program is presented. The functional abstraction of this logic is not carried out based on individual control signals as before, but rather, the automation system is provided with components with a standardized interface. These interfaces may be based, for example, on the work of the VDI/VDE/NAMUR 2658, PackML, or the OPC UA companion specification. With this approach, the modularization concept for process engineering plants, which has already been implemented at the level of entire process functions as part of VDI/VDE/NAMUR 2658, is expanded to the field or individual control level. This likewise distinguishes the mechanism presented here from IEC 61499, which is based solely on individual signals and events.

In summary, it may be stated that the following considerations lead to the present embodiments.

The individual control level (e.g., actuators, sensors, regulators) is separated from the equipment control level (e.g., automation services).

The separation of the individual control elements (e.g., field devices, sensors, actuators, IO stations) from the automation equipment functions makes it possible to separate the executing system. Individual control elements may be processed in a different programmable logic controller PLC to the equipment functions.

The individual control level is encapsulated with the aid of a functional interface: previously signal integration, recently thing integration, that is to say of uniquely identifiable physical objects.

Individual control elements in modern systems are connected in a signal-based manner. Different devices are connected using a different number of signals (e.g., input and output signals). This variance hampers, for example, the replaceability of the sensors and actuators in highly flexible systems. As a result of the encapsulation at the functional level, there is a need for an interface that conceals the variance at the signal level behind a functional interface that always remains the same.

This interface may be standardized. In this case, VDI/VDE/NAMUR 2658-3 is appropriate.

The introduction of an intermediate layer, also referred to as the "component abstraction and management layer" (CAML) below, provides the handling of the "things" in a comparable manner to signals.

Modern systems are subject to a dedicated hardware configuration that derives information that is used to configure the deterministic bus systems. As part of network technology that is more and more powerful, IP-based protocols are being increasingly used. A high degree of flexibility will be able to be achieved only when the rigid coupling between hardware and software is released. This task may be undertaken by the intermediate layer, the component abstraction and management layer CAML. The component abstraction and management layer CAML is used as a mediator between equipment functions (e.g., service components) and individual control functions (e.g., control components).

The solution is also shown below in the form of an embodiment.

DETAILED DESCRIPTION

Figure 1:
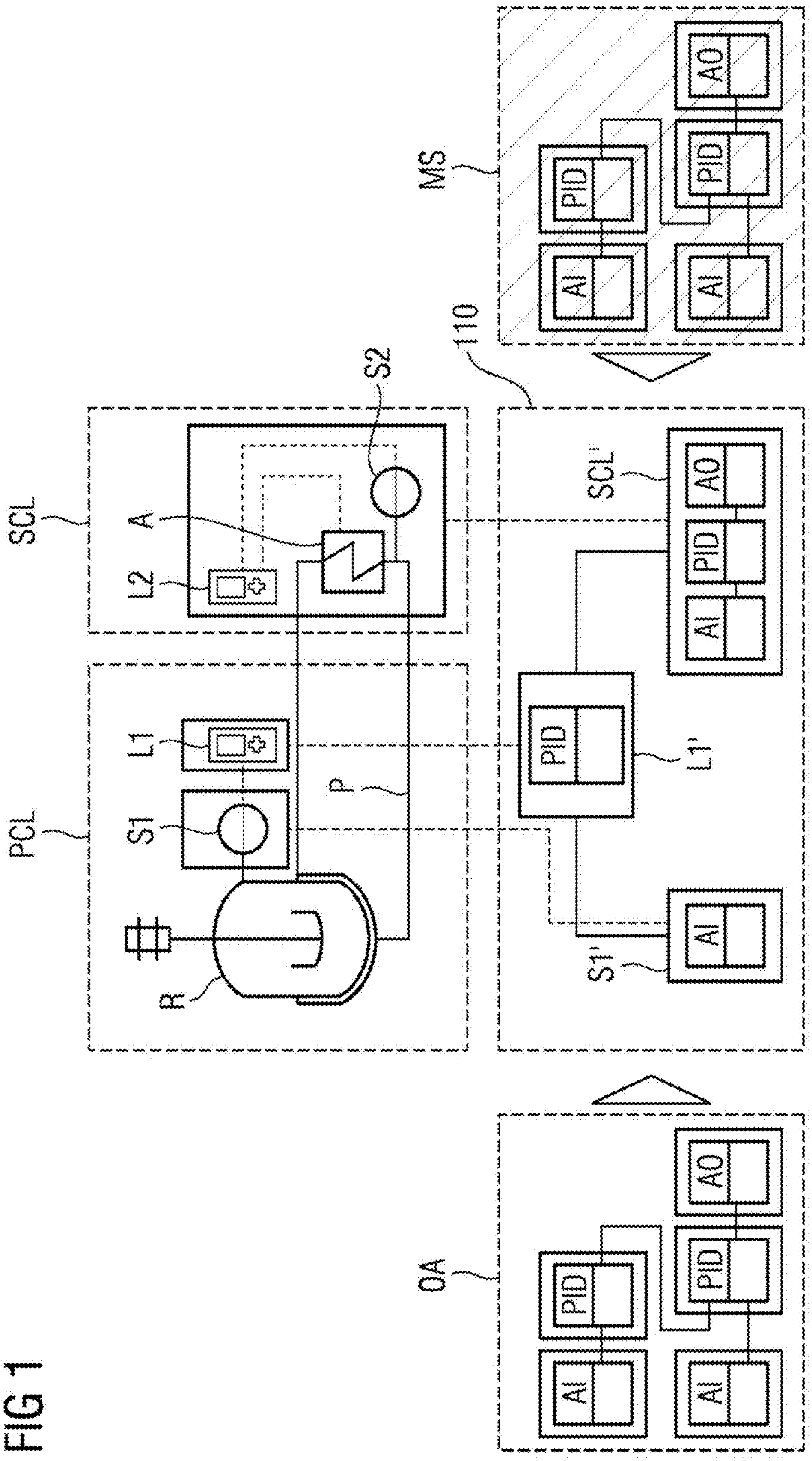
FIG. 1 shows an example of a plant with a comparison of the OPAS/MTP concept.

FIG. 1 shows an example of an automation plant including a first control loop PCL that includes a reactor R and a first sensor S1 for measuring a temperature in the reactor R. These measured values are recorded in a controller L1. Content of the reactor R may be pumped, by a pipeline P, through a heating device A that increases or possibly decreases the temperature of the content contained in the reactor R. This pipeline P has a second sensor S2 that is connected to a separate controller L2. This is a second control loop SCL.

In comparison, the manner in which the controller and the measurement data are used is now arranged under the example arrangement. Use according to the OPAS, OA standard already described above is shown on the left-hand side in the first box OA. These are the functional blocks AI for input, AO for output, and control circuits PID.

In comparison, the arrangement according to the MTP service MS is shown on the right-hand side. The functional blocks included are encapsulated to the extent that the functional blocks are not accessible from the outside in a type of black box and cannot be addressed at the element level, but only at the functional level.

The middle box 110 now shows the solution according to the present embodiments, which also shows that modularity is possible in various increments: the left-hand box S1' relates solely to the left-hand sensor S1; and the right-hand box SCL' relates to the complete control loop under SCL, which then has further subelements AI, PID, AO.

Figure 2:
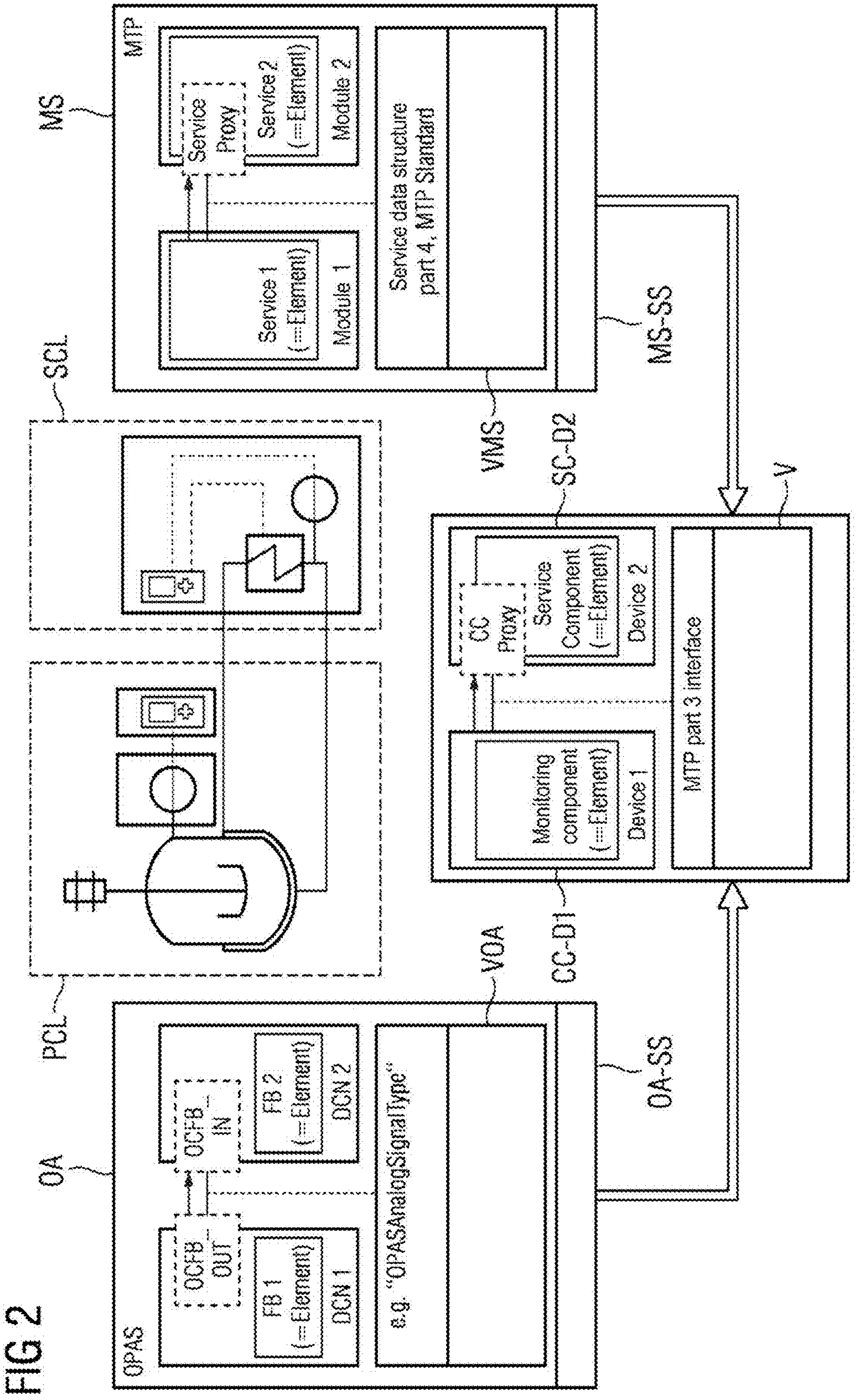
FIG. 2 shows a comparison with transferred values.

FIG. 2 again shows the same structure of an example of an automation system with the two control loops. The boxes OA and MS again relate to the solution according to the OPAS (e.g., signal-oriented) and MTS (e.g., function-oriented) standards.

Variables that are used are shown on the left-hand side, such as:

Value

Engineering unit

Range

Simulation value, or

Simulation state.

Values are accordingly shown on the right-hand side:

WQC (worst quality code, from the Namur standard)

Command

Procedure

State.

This illustration is intended to show the interoperability of the proposed component-focused solution, in which various possible implementations are shown.

Figure 3:
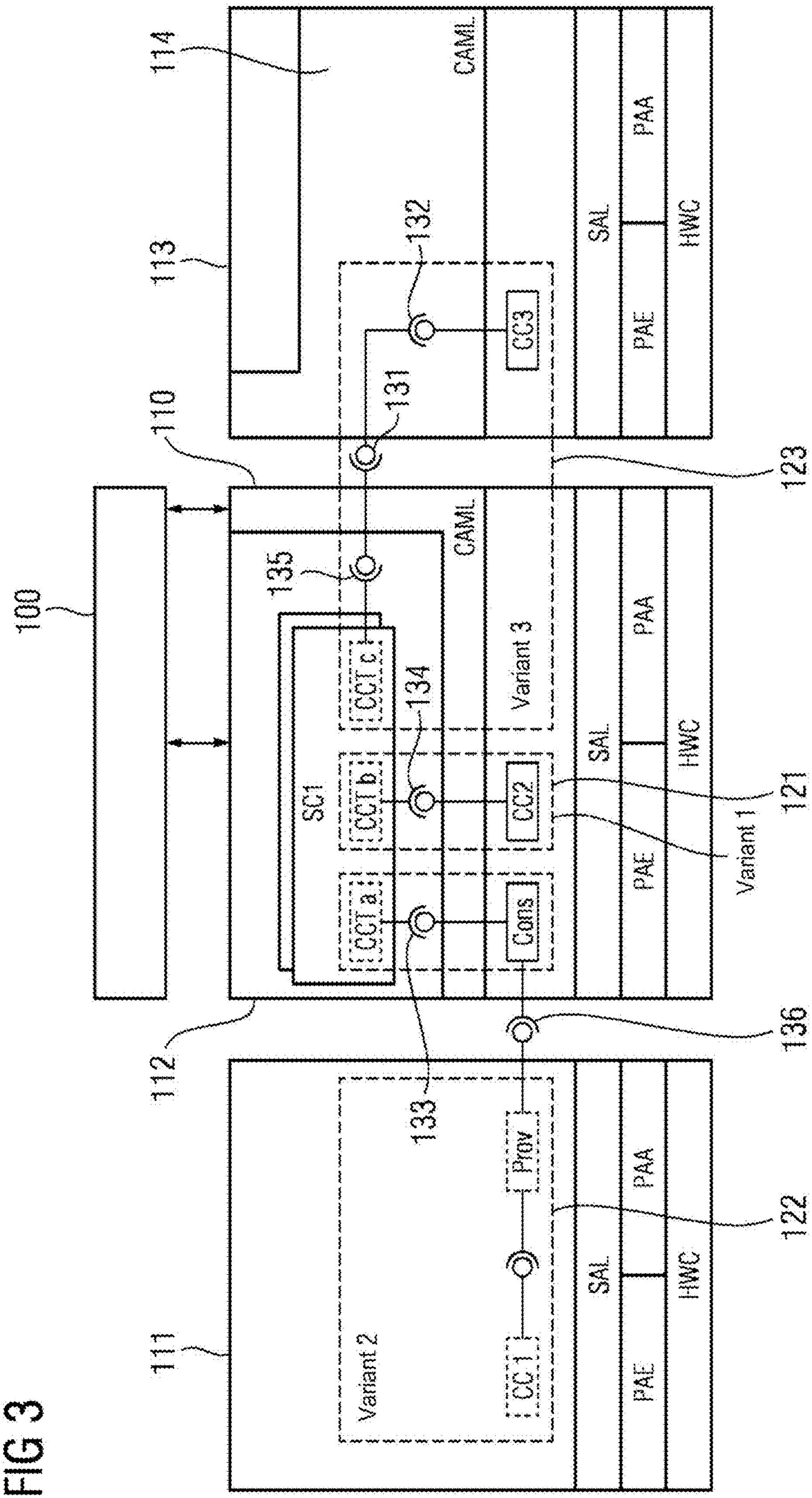
FIG. 3 shows architecture variants for implementing a CAML.

FIG. 3 shows three different implementation variants of the CAML approach, where the CAML undertakes different tasks of the tasks shown above. Any desired combination of these variants in a system is possible.

Figure 5:
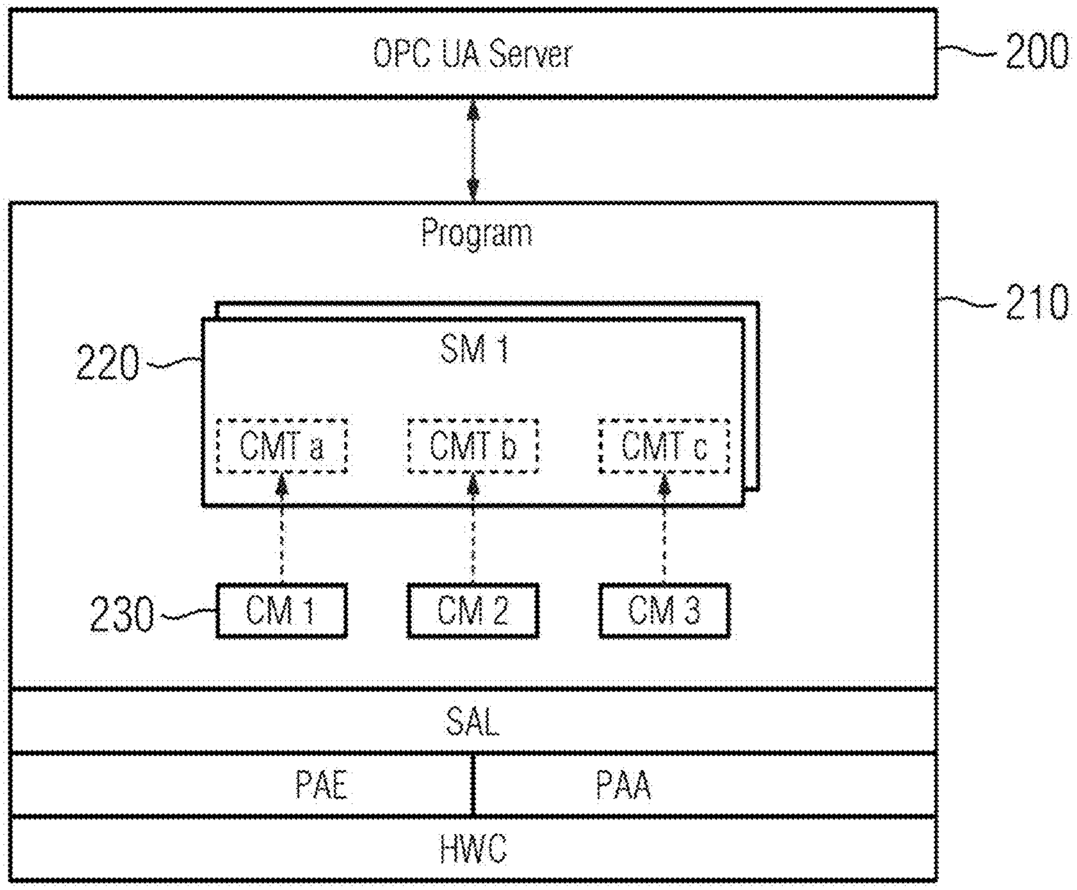
FIG 5 (PRIOR ART)
FIG. 5 shows, for comparison, an architecture concept according to the prior art.

The lower layers SAL, PAE, PAA, and HWC are the same as FIG. 5 and to the layers already described further above.

Variant 1: in this variant, a service component SC 1 and the control component CC 2 to be integrated are executed in the same controller. Communication beyond controller limits is not required in this case. However, it is necessary to map the CC functionality to a standardized interface and to assign it to the desired CCT (CCT b) in the SC. The CAML therefore undertakes an abstraction and assignment functionality. This variant resembles the known architecture with the difference that the CAML was now added as an abstraction level, and a configurable assignment between CCs and CCTs thus becomes possible.

Variant 2: a further variant shows a CC (CC 1) that is executed in a different controller to the SC (SC 1), in which it is intended to be integrated. In this case, cross-controller communication is to be provided in order to interchange data between the CC (CC 1) and the CCT (CCT a). However, this communication is not undertaken via the CAML, but rather, via a provider/consumer approach. This provides a provider module (Prov) and a consumer module (Cons). The Prov has the task of abstracting the functionality of the CCs and mapping it to a standardized interface if the control module CM does not already bring a standardized interface. In addition, Prov and Cons are used to set up a communication connection and therefore to make the data available to the CC in the controller in which the SC is implemented. The Cons is a representation of the CC functionality and may be used as if the CC itself were implemented in this controller. This communication is abstracted behind the CAML. In addition, the CAML undertakes the assignment functionality between the CC (CC 1) and the CCT (CCT a), as in Variant 1.

Variant 3: as in Variant 2, the service component SC 1 and the control component CC 3 to be integrated are also executed in different controllers in this case. Cross-controller communication is therefore also to be provided in this variant. In contrast to Variant 2, however, this communication functionality is executed by the CAML itself in this case. A CAML is implemented in the controller in which the CC is implemented and, if necessary, maps the CC functionality to a standardized interface. This CAML is able to communicate with the CAML of the controller on which the SC is implemented. In this manner, it is again possible for the CAML to abstract the functionality of the CC and to make the functionality of the CC available to the SC as a component with a standardized interface. This component may then also be assigned by the CAML to a CCT and is in the previous two cases. In this case, the two CAMLs therefore undertake both the abstraction and assignment functionality and the communication functionality.

From the point of view of the main program (e.g., the SC in this case), it is irrelevant which of the previously described variants are implemented in a system. As a result of the abstraction functionality that is provided in all variants by the CAML, the SC is always provided with components with a standardized interface that may be integrated. It is irrelevant to the SC whether the CCs are on the same controller as the SC (Variant 1) or are outsourced to other controllers (Variants 2 and 3) and how exactly the CCs are implemented. This provides the advantage that it is possible to flexibly change between the presented variants.

If, for example, a sensor connected inside the controller (Variant 1) has a fault, an external sensor may be connected without any problems (e.g., using Variant 3), and temporarily or permanently replaces the faulty sensor.

Configuration and Runtime Interface

As already described further above, the architecture proposed here also has a configuration and runtime interface that is used to parameterize and adjust the service components. An interface that configures the CAML is also to be provided. This interface is used to determine which control components are intended to be assigned to which CCTs. The interface may be implemented, for example, by an OPC UA server.

Figure 4:
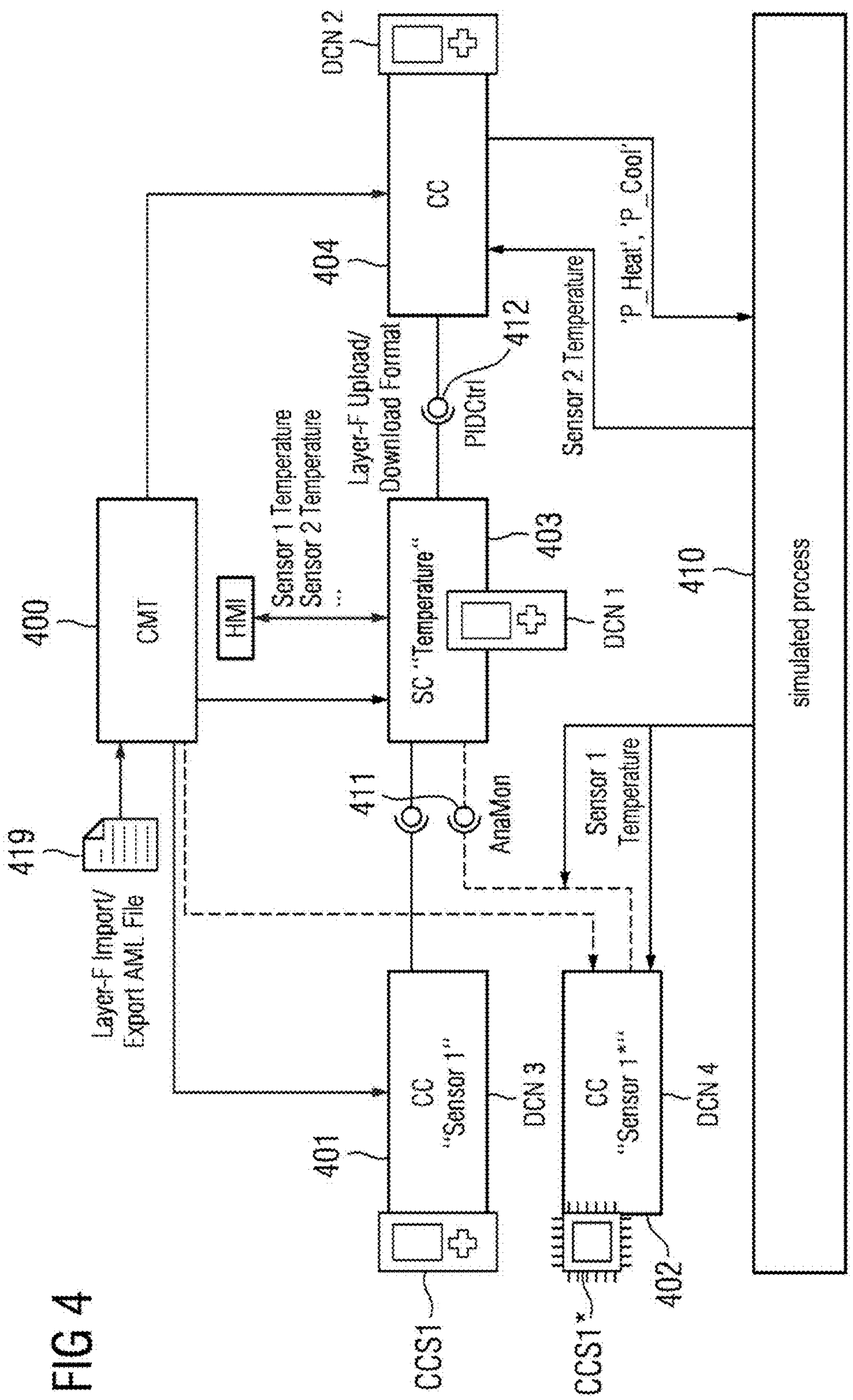
FIG. 4 shows an embodiment with two temperature sensors.

FIG. 4 explains an embodiment in more detail using fictitious values based on the exemplary plant already described further above. In the text below, the intention is to reconfigure a first temperature sensor CCS1 to an alternative, second temperature sensor CCS1*.

The configurations are carried out by a configuration management tool 400. and the required values are provided by a configuration file 419 (layer-F import/export AML file).

The two control components Sensor 1 and Sensor 1* are a control component as an AnaMon provider.

The “tempering” method (SC) 403 is controlled by the distributed control node DCN1 “reactor,” which connects to the sensors and controllers DCN3, DCN4 using suitable interfaces 411, AnaMon.

SC Tempering Consumer

AnaMon-Con.: opc.tcp://192.168.2.50:4840/ns=3:s=“TREAC”

PIDCtrl-Con.: opc.tcp://192.168.2.50:4840/ns=3:s=“TEMPC”

SC tempering has an AnaMon consumer for the actual temperature recording in the reactor and a PIDCtrl consumer for inlet temperature control.

Consumer=CC requirement/placeholder

The control component "CC sensor 1" 401 has a provider that is addressable at {opc.tcp://192.168.2.10:4840/ns=3:s="TI001"}.

The control component "CC sensor 1*" 402 has a provider that is addressable at {opc.tcp://192.168.2.11:4840/ns=3:s="TI002"}.

The control component "PID Ctrl" 404 has a provider that is addressable at {opc.tcp://192.168.2.20:4840/ns=3:s="TIC101"}.

The service component "tempering" 403 has two consumers (e.g., users) that are addressable as follows: AnaMon consumer in 411 in the role of reactor actual temperature is addressable at {opc.tcp://192.168.2.50:4840/ns=3:s="TREAC"}; PIDCtrl consumer 412 in the role of reactor inlet temperature is addressable at {opc.tcp://192.168.2.50:4840/ns=3:s="TEMPC"}

The provider function of the service is not explicitly illustrated in the figure.

In order to combine a provider/consumer relationship, the respective other address now needs to be configured in the corresponding partner.

AnaMon Consumer Configuration of the Provider:

{opc.tcp://192.168.2.10:4840/ns=3:s="TI001"}.

AnaMon Provider Configuration of the Consumer:

{opc.tcp://192.168.2.50:4840/ns=3:s="TREAC"}

PIDCtrl Consumer Configuration of the Provider:

{opc.tcp://192.168.2.20:4840/ns=3:s="TIC101"}

PIDCtrl Provider Configuration of the Consumer:

{opc.tcp://192.168.2.50:4840/ns=3:s="TEMPC"}.

The following relationships were therefore reconfigured:

Tempering.TREAC uses "TI001"

Tempering.TEMPC uses "TIC101".

In the present example, an active bidirectional implementation was selected. This provides that the consumer and the provider have each read the values to be processed from their partner (e.g., in OPC UA, reading is the active part of communication).

The relationship may therefore also be monitored on both sides.

The cascaded control of the reactor tempering example functioned after activating interaction.

Generalization of the CAML Approach

In summary, the CAML approach subdivides automation software into two parts: the hardware-specific logic (e.g., the CCs) and the function-specific logic (e.g., the SCs). The CAML essentially has the task of abstracting the hardware-specific logic in terms of its specific form and the location at which it is executed and making it available to the function-specific logic in the form of components with standardized interfaces. One possible implementation was shown within the scope of the present embodiments based on an architecture based on the VDI/VDE/NAMUR 2658 guideline.

However, the CAML approach may not only be applied to the concepts of modular plants. The concept of present embodiments also provides added value in conventional PLC programs. The concept makes it possible to integrate intelligent devices, the functionality of which is implemented as decentralized intelligence directly in the field, in the control code in a fast, simple, and flexible manner.

Such an integration mechanism for decentralized intelligence is pioneering and is in line with currently arising trends. For example, the approach of the Industrial Internet of Things (IIoT) is heavily based on implementing the access logic for sensors and actuators directly in the field using intelligent devices. This makes integration of decentralized intelligence in a PLC program inevitable. The Open Process Automation Standard (OPAS) [6] is also increasingly embracing the practice of distributing automation functionality in a very compartmentalized manner among a number of distributed control nodes (DCNs). The focus is on decentralized intelligence, and a corresponding integration mechanism is to be provided.

With regard to future use of the presented concept in the industrial environment, a useful possibility is to be designed for engineering the CAML. This design is still outstanding. One approach is to introduce a new tag type. In modern engineering tools, inputs, outputs, and flags are generally available as tag types. In the future, there may also be a "component" tag type that makes it possible to incorporate entire intelligent components implemented in a decentralized manner in the field.

The introductory part of the description showed what challenges exist in modern automation systems with regard to the five enabling features for changeability. The text below again summarizes how these challenges may be managed using the described approach.

The abstraction of sensor and actuator access logic and the mapping thereof to a standardized interface are provided. For example, each valve is represented by the same interface irrespective of how the valve function is implemented in detail and whether or not there is a feedback signal. Sensors/actuators of different types (e.g., different valve types) may therefore be integrated in the same manner in the automation system, and there is replaceability that complies with the change enabler of universality.

As a result of the more universal interfaces of the sensor and actuator functionalities, it is also easily possible, based on the described subject matter, to incorporate more powerful or more complex sensors and actuators in the automation system, which favors scalability.

As a result of the use of consistent standardized interfaces (e.g., one interface for all valve types, one interface for all motor types), compatibility may also be provided across different sensors and actuator types.

In the presented concept, decentralized implementation of the logic for accessing sensors and actuators is also proposed. This logic is therefore executed directly in the field (e.g., on a miniature controller or a microcontroller directly on the sensor or actuator). Sensors and actuators therefore provide all logic needed for their control. It is therefore easily possible to more easily move a sensor and actuator to another location of the plant. This favors the change enabler of mobility.

The CAML approach implements an abstraction of sensor/actuator access logic in standardized components. In this manner, the concept of modularity is extended to the field or individual control level.

The challenges with regard to the change enablers of process plants may be managed based on the presented concept. Therefore, changeability is no longer possible only at the level of the modular process units PEA, as described in the architecture concept of VDI/VDE/NAMUR 2658, but also at the level of the individual control units (e.g., the actuators, sensors, and control loops).

A further advantage becomes apparent in the decentralized implementation of the access logic for sensors and actuators of the present embodiments. This implies a separation of function-specific logic (e.g., SC) and hardware-specific logic (e.g., CC). A number of further advantages result from this separation.

The reusability of the function-specific logic may be increased, and the ability to update function-specific logic may be improved.

The degrees of freedom in the configuration of the hardware or process connection may be increased.

As a result of the introduction of a separation between device-specific logic and function-specific logic, the engineering of both logic components may be carried out largely independently of one another.

Function-oriented logic may therefore be externally delivered as a pre-engineered and pre-tested component.

Device-specific logic may be provided in a form pre-engineered by the firmware of the devices.

Executing function-specific logic on central computer systems (cf., for example, OPAS ACP) makes it possible to implement a plurality of "virtual" modules/skids/PUs on hardware. The following advantages then arise: The costs for the machine or module builder are reduced. Flexibility is provided by scalable PLC resources. A separation of device-specific logic and function-specific logic makes it possible to distribute the logic components among various devices. It is possible to efficiently use device resources by executing a part of the logic, which was previously executed on PLC resources, on device resources in a decentralized manner. In the event of a fault, it is easily possible to replace defective devices.

The introduction of standardized component interfaces may result in restrictions in the diagnosis of the decentralized peripherals. Only the information that is also provided in the standardized interface may be read from the component.

In addition, it is no longer possible to implement a cross-system hardware configuration at the time of engineering since it is possible to quickly and easily replace decentralized peripherals at the runtime. It is therefore necessary to provide new approaches for configuring the hardware in such flexible systems.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method in a distributed automation system comprising at least one physical element, for coupling functional control of the distributed automation system to the at least one physical element using at least one automation function, wherein the distributed automation system comprises automation software that is subdivided into two parts, the two parts comprising hardware-specific logic for at least one monitoring component, and function-specific logic for at least one service component, the method comprising:

abstracting functionality of the at least one physical element in a monitoring component and mapping a real interface of the at least one physical element to a previously standardized interface;

assigning the at least one physical element to a placeholder having a same standardized interface as the at least one physical element;

encapsulating the at least one automation function in a service component having at least a first interface to the at least one physical element and at least one further communication interface; and communicating between the at least one physical element and the service component or the placeholder, wherein a physical element of the at least one physical element is configurable at any time during a runtime of the distributed automation system using a communication interface.

2. The method of claim 1, wherein the at least one physical element comprises functionality of a sensor or an actuator in the distributed automation system.

3. The method of claim 1, wherein the standardized interface is defined according to a version of the VDI/VDE/NAMUR 2658 standard.

4. The method of claim 1, wherein the communication interface operates according to the OPC UA standard.

5. The method of claim 1, wherein the service component has at least one interface to further service components for a superordinate automation function that accesses subordinate automation functions encapsulated in the further service components.

6. An apparatus for coupling functional control in a distributed automation system using at least one automation function in the distributed automation system comprising physical elements, wherein the distributed automation system comprises automation software that is subdivided into two parts, the two parts comprising hardware-specific logic for at least one monitoring component, and function-specific logic for at least one service component, the apparatus comprising:

a controller configured to execute:

the at least one monitoring component that comprises an abstraction of functionality of at least one physical element of the physical elements and a mapping of a real interface of the at least one physical element to a previously standardized interface, wherein the at least one physical element is assignable to a placeholder having a same standardized interface as the at least one physical element; and at least one service component that has an encapsulation of the at least one automation function and comprises at least one interface to the at least one physical element and at least one further communication interface that enables communication between the at least one physical element and the at least one service component, wherein the controller is configurable at any time during runtime of the distributed automation system using a communication interface.

7. The apparatus of claim 6, wherein the at least one physical element comprises functionality of a sensor or an actuator in the distributed automation system.

8. The apparatus of claim 6, wherein the standardized interface is defined according to a version of the VDI/VDE/NAMUR 2658 standard.

9. The apparatus of claim 6, wherein the communication interface operates according to the OPC UA standard.

10. The apparatus of claim 6, wherein the at least one physical element and the at least one monitoring component are implemented in the same controller, and communication takes place between the at least one monitoring component and a control component using interfaces inside the controller.

11. The apparatus of claim 6, wherein the at least one physical element and the at least one monitoring component are not implemented in the same controller, and communication takes place between the at least one monitoring component and a control component via a cross-controller interface using a provider/consumer approach.

12. The apparatus of claim 6, wherein the at least one physical element and the at least one monitoring component are not implemented in the same controller, and communication takes place between the at least one monitoring component and a control component via a cross-controller interface.

* * * * *